No. 692,528. Patented Feb. 4, 1902.
N. W. KIRKPATRICK & M. HENRY.
MACHINE FOR MAKING COTTER PINS.
(Application filed Aug. 9, 1901.)

(No Model.) 5 Sheets—Sheet 3.

WITNESSES.
C M Theobald
Matthew Siebler

N. W. Kirkpatrick
Michael Henry,
INVENTORS
By R. J. M'Carty,
their ATTORNEY.

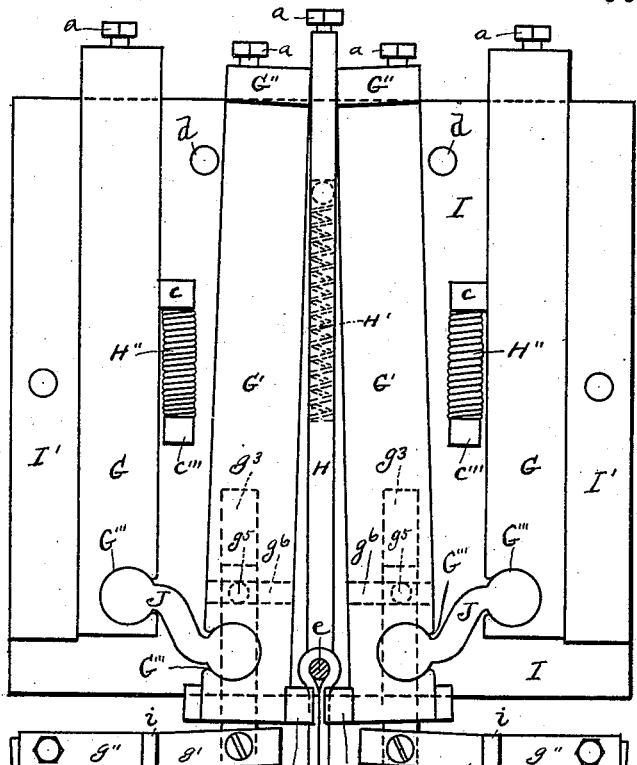

No. 692,528. Patented Feb. 4, 1902.
N. W. KIRKPATRICK & M. HENRY.
MACHINE FOR MAKING COTTER PINS.
(Application filed Aug. 9, 1901.)
(No Model.) 5 Sheets—Sheet 5.
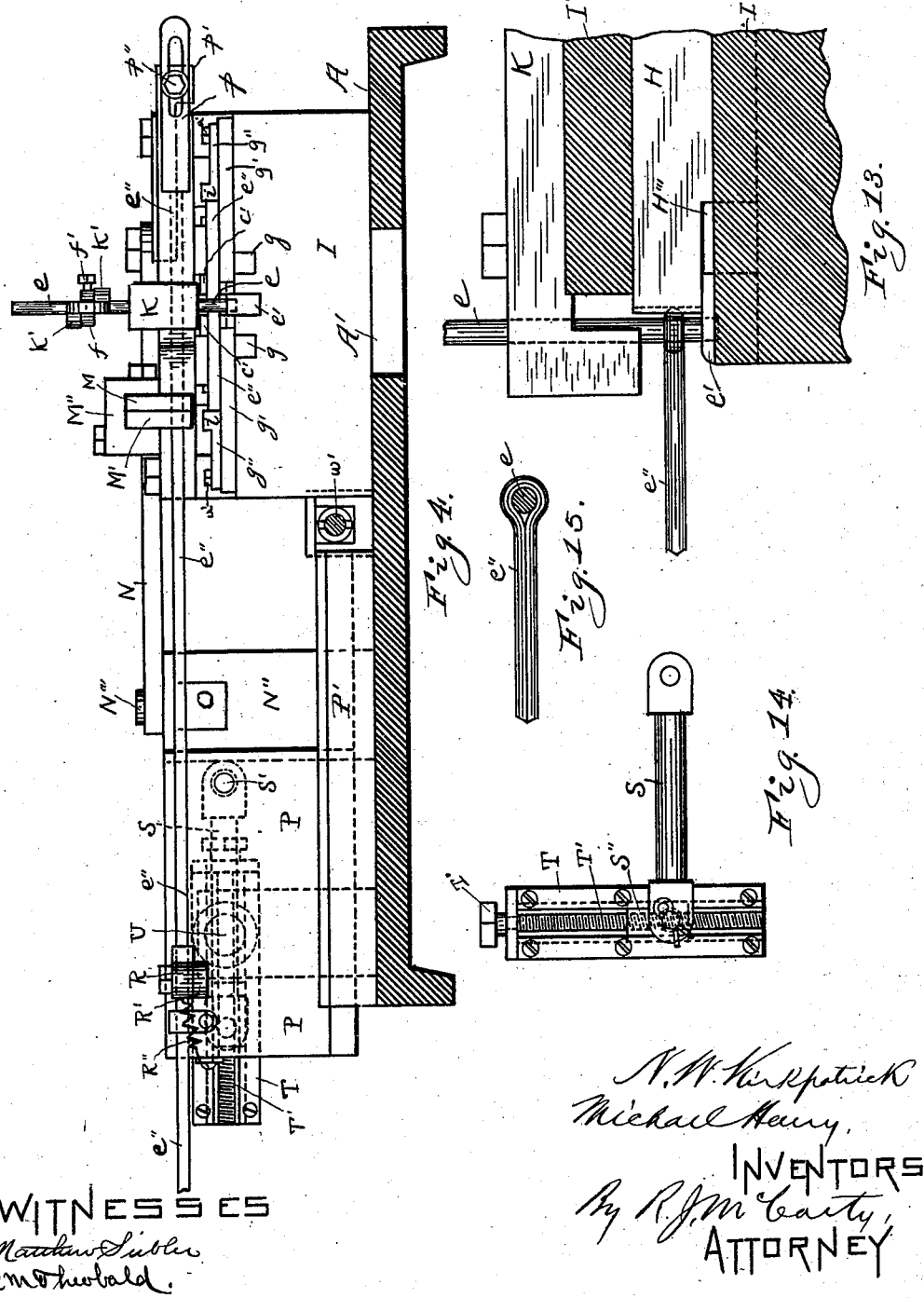

UNITED STATES PATENT OFFICE.

NATHANIEL W. KIRKPATRICK AND MICHAEL HENRY, OF DAYTON, OHIO.

MACHINE FOR MAKING COTTER-PINS.

SPECIFICATION forming part of Letters Patent No. 692,528, dated February 4, 1902.

Application filed August 9, 1901. Serial No. 71,512. (No model.)

*To all whom it may concern:*

Be it known that we, NATHANIEL W. KIRKPATRICK and MICHAEL HENRY, citizens of the United States, residing at Dayton, in the county of Montgomery and State of Ohio, have invented certain new and useful Improvements in Machines for Making Cotter-Pins; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in machines for making cotter-pins, the novel features of which are hereinafter described and claimed.

Preceding a detail description of the invention reference is made to the accompanying drawings, of which—

Figure 1:
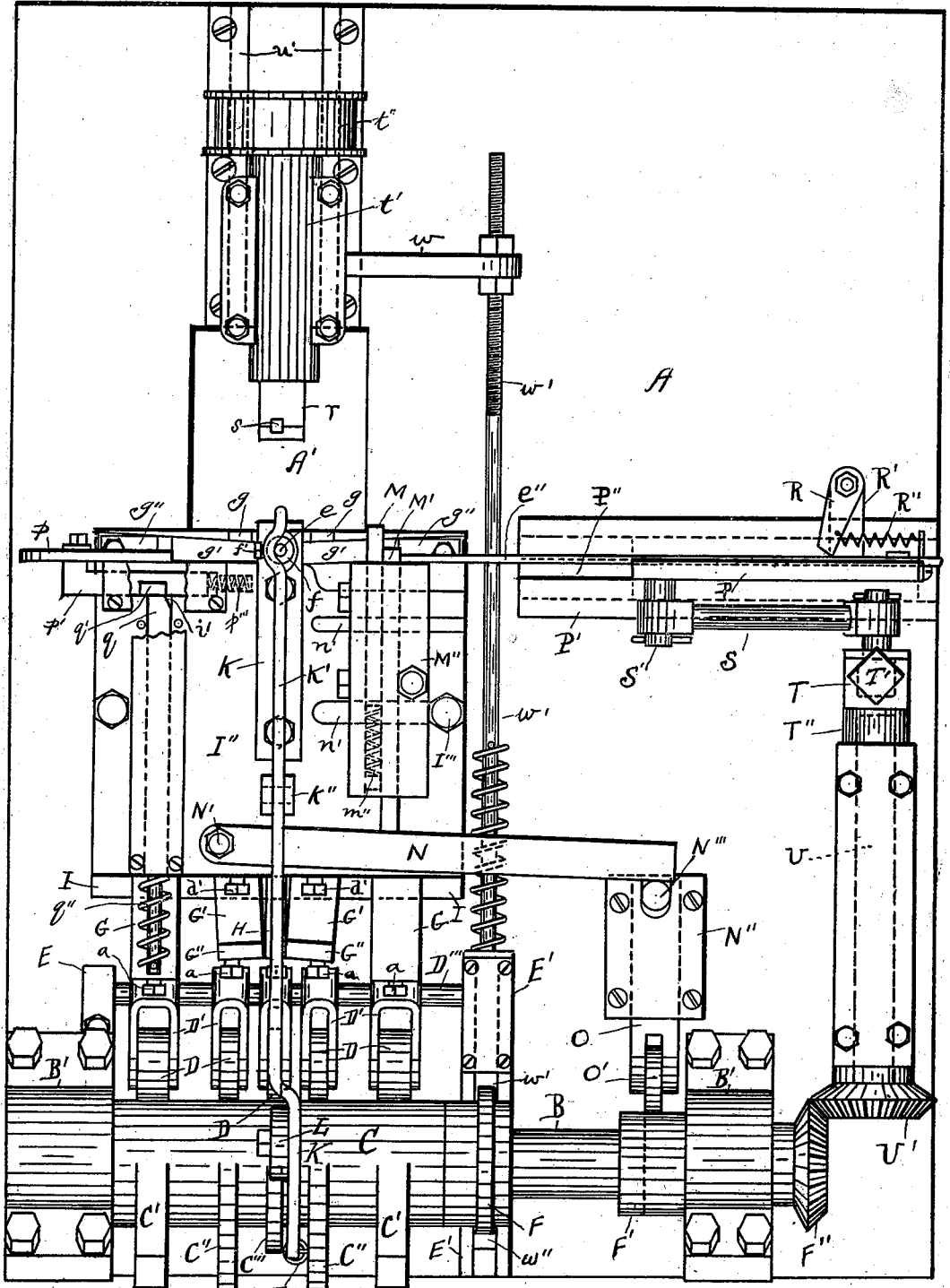
Figure 2:
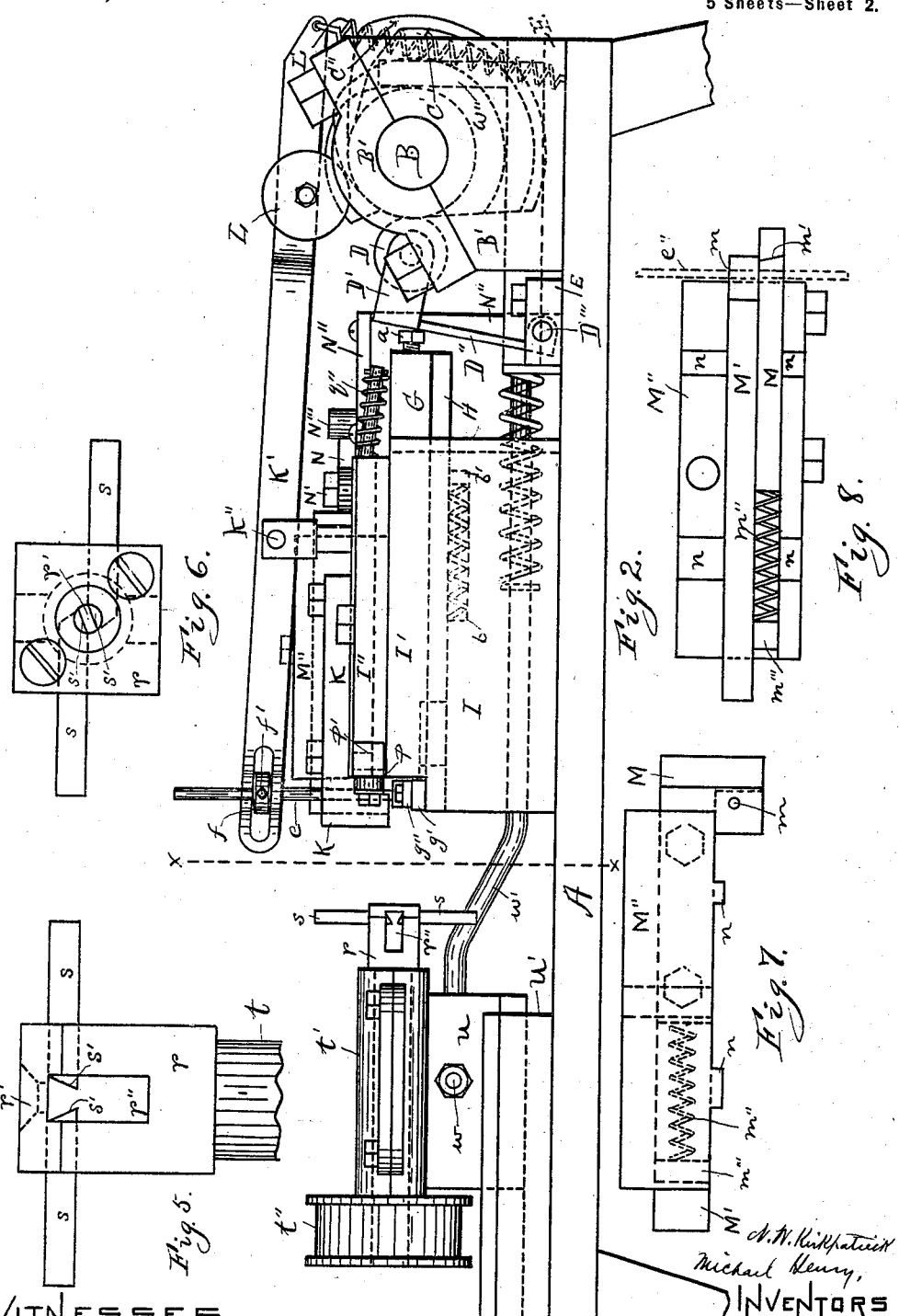
Figure 3:
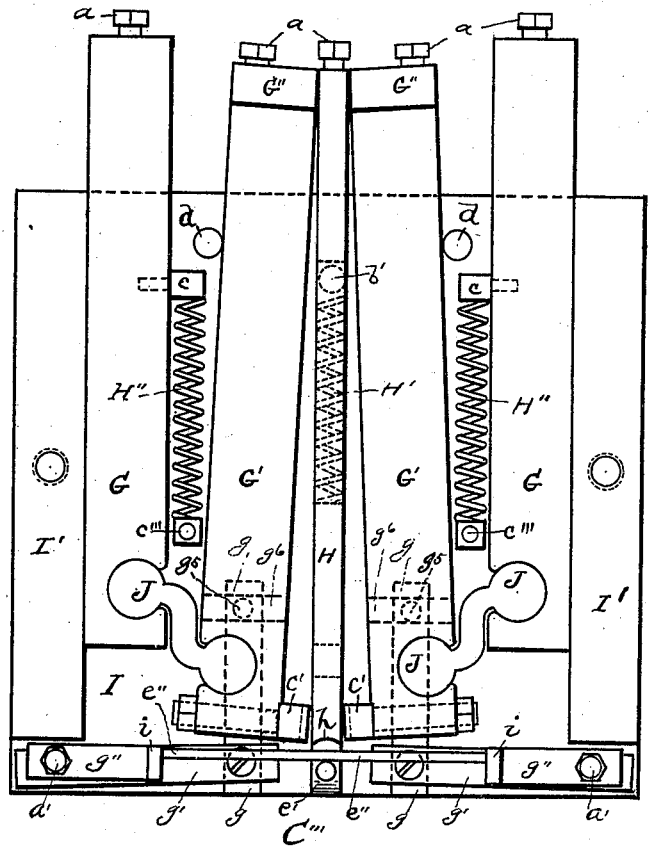
Figures 10, 11, 12:
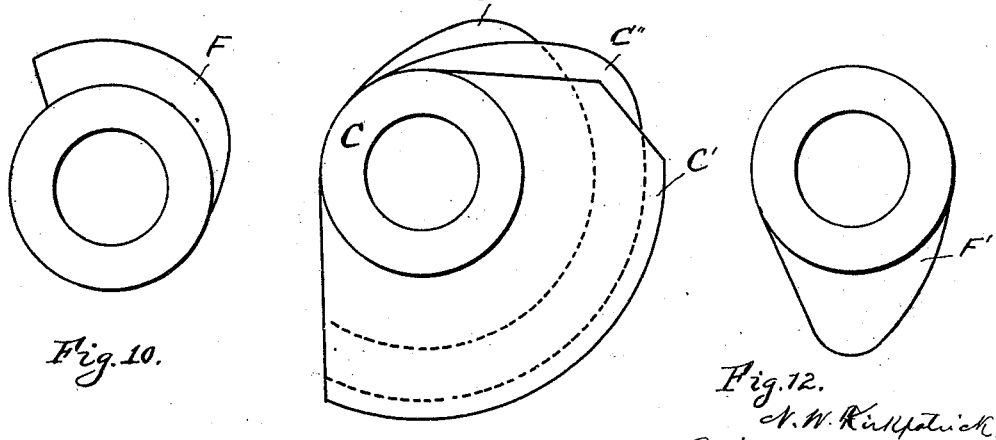

Figure 1 is a top plan view of the machine. Fig. 2 is a side elevation. Figs. 3 and 3ª are top plan views of the bending mechanism. Fig. 4 is a section on line $xx$ of Fig. 2. Fig. 5 is an elevation of the pointing mechanism. Fig. 6 is a top plan view of Fig. 5. Fig. 7 is a side elevation of the cutters. Fig. 8 is a bottom plan view of Fig. 7. Fig. 9 is a detail of a portion of the centering devices. Figs. 10, 11, and 12 are detail elevations of the cams; Fig. 13, an enlarged sectional elevation of portions of the cotter-forming mechanism; Fig. 14, a detail of a portion of the wire-feeding devices; Fig. 15, a view of a finished cotter-pin. Fig. 16 is a sectional view of an end portion of one of the reciprocating bars and a portion of the base-plate beneath. Fig. 17 is a front end view of one of the reciprocating bars.

In the following detailed description of our invention similar reference characters will indicate corresponding parts as they appear in the drawings.

A designates the base or table, upon which the various mechanisms are supported. B is the main driving-shaft of the machine, which is mounted on said table in bearings B'. C is a sleeve which is fastened to said shaft and from which project five cams, as follows: C', C', C'', C'', and C'''. The two outer cams C' C' are of uniform shape, also the two inner cams C'' C'' are of similar shape, while the center cam C''' has its own peculiar shape, as shown in Fig. 11. This cam C''' acts in advance of the other cams. D designates a series of rollers which are in positions to be actuated at predetermined periods by said cams. Each of these rollers is mounted in a frame or yoke D', which yokes are connected to or are integral parts of depending rocker-arms D'', which are loosely mounted at their lower ends to shaft D''', said shaft D''' being supported in bearings E E'. (See Fig. 2.)

G G and G' G' designate four reciprocating bars, which are actuated by the yokes D' coming in contact therewith under the movements of the cams C' C''. The outer ones G G of such bars are actuated in a uniform manner by the outer cams C' C', while the inner ones G' G' of such bars are actuated in a similar manner by the cams C'' and C''. The inner bars G' G' have lugs G'', which limit the movements thereof when actuated by the cams by coming in contact with stops $d'$, which are secured to the top plate I''. Secured to the ends of the bars G G G' G' are contact lugs or projections $a$, which lie in the paths of the yokes D' and are therefore struck by said yokes when the latter are driven forward by the cams. As seen in Figs. 3 and 3ª, these bars are mounted to slide upon the base-plate I and are inclosed by the top plate I'', which is secured to said base-plate, as shown in Fig. 1.

Referring, further, to Figs. 3 and 3ª, it will be noted that the inner bars G' G' diverge or spread outwardly from the ends with which contact is made. $d\ d$ are two guide-studs which lie on the outer sides of said bars G' G'. These studs project from the base-plate I and are in positions that permit of said bars having the necessary spreading movements in the operations of the machine.

The outer-bars G G occupy parallel positions and are capable of longitudinal movement only. The outer sides of said bars are inclosed by guide-strips I', which are secured to the base-plate I. H'' designates compression-springs, the ends of which are secured to studs $c$, projecting from the inner sides of said bars, and to studs $c'''$, projecting from the base-plate. When the bars G G are not under the control of their cams C' C', as shown in Fig. 3, these springs by expanding move said bars back to positions shown, which positions take place just before the operation of bending a cotter-pin. The outer ends of the bars G G and G' G' have circular recesses G''', into which the heads of connecting-links J J fit, and whereby each inner bar G' is connected to the adjacent outer bar G.

It will be understood that as bars G G are advanced by their respective cams the outer ends of the bars G' G' will be moved toward each other from the positions shown in Fig. 3 to the position shown in Fig. 3ª through the instrumentality of the links J J. During these movements of said bars the said links are necessarily permitted to turn in the openings G''' in both bars.

H is a clamping-bar which has reciprocating movement similar to bars G G'. This bar H occupies a position between the bars G' G'. The front end thereof is rounded out, as at $h$, Fig. 3, and the function of said bar is to hold the pieces of wire $e''$, from which the pins are formed, against the pin $e$ while the formers $c'$ press the said wire in and around the pin $e$, as in Fig. 3ª, and thus forms the cotter, as shown in Fig. 15. The clamping-bar H is actuated by cam C'''' and the center roller D. (See Fig. 1.) When not under the control of said cam, the said bar is under the control of a spring $b$, one end of which is attached to a stud $b'$, projecting from said bar, and the other end of said spring being seated against a shoulder formed by the recess in the base-plate I, in which said spring $b$ is placed. (See Fig. 2.)

The formers $c'$, as shown in Fig. 17, are secured to the ends of the inner bars G' G', and the surfaces thereof which grasp the wire $e''$ have rounded recesses $c''$, that receive the rounded sides of the wire when the bars G' G' are moved in by the bars G G and the links J. The outer bars G G have only one movement—namely, a longitudinal reciprocating movement—while the inner bars G' G' have in addition to such movement an inward movement, which is due to the link connections with bars G G. The longitudinal movements of said bars G' G' advance them to a position to bend the wire around the pin $e$ when the inward movements of said bars take place. The bars G' G' are returned to the normal positions, as in Fig. 3, by the expansion-springs H'' and the link connections J. Owing to the cams C'' C'' having necessarily a greater extent of moving surface, the bars G' G' are actuated first, and as said bars are about to reach the positions to grasp the wire on each side of the pin $e$ the bars G G are advanced by cams C' C', and the result is the cotter-pin is formed as in Fig. 3ª. The formers $c'$, as shown in Fig. 17, as before stated, are secured to the ends of the bars G' G', and the surfaces thereof which engage with the wire are provided with rounded recesses $c''$, which receive the rounded or outer sides of the wire.

K is a block secured to the top plate I'' and having a guide-opening in one end through which the pin $e$ passes.

K' is a rocker-arm to which the pin $e$ is secured. The end of said arm is provided with an opening which receives a collar $f$, through which the pin $e$ passes and which is made secure to said pin $e$ by a screw $f'$. (See Fig. 2.) When the pin $e$ is in a position to enable the clamping-bar H and the formers $c'$ to perform their functions, the said pin has entered the die $e'$. (See Figs. 3 and 4.) The pin $e$ is given the necessary movements through the rocker-arm K', which is fulcrumed at K'', and is held normally in a position with the pin $e$ out of the die by means of a spring L', which is connected to the end of said arm and the table. The said arm is actuated at predetermined periods to lower the pin into the die by means of a roller L, which is mounted thereon in the path of the cam C''''. (See Figs. 1 and 2.) Centering devices, by means of which each piece of wire after it is cut assumes a proper position to enable the pin $e$ to occupy a position in the center thereof, will now be described. (See Figs. 3, 3ª, 4, 9, and 16.)

$g\,g$ designate two bars which lie in recesses $g^3$ in the upper side of the base-plate I. The inner ends of these bars have studs $g^5$, which enter transverse slots $g^6$ in the under side of the bars G', and thereby the said bars $g$ are given movement by the bars G' G' from the positions shown in Fig. 3 to the positions shown in Fig. 3ª, the transverse slots $g^6$ permitting the spreading movements of said bars G' G' without imparting to the bars $g$ similar movements.

$g'$ designates bars lying at right angles to the bars $g$ and fixed thereto at $a''$. Secured to the last-named bars are third bars $g''$, which are adjustable in their attachment with the pieces $g'$ in adapting said devices to center stock or wire for different sizes of cotters. The bars $g''$ have upturned ends $i$, which inclose the ends of the stock or pieces of wire $e''$, from which the cotter-pins are formed. (See Figs. 3 and 4.)

We will next describe the wire feeding and cutting mechanism. (See Figs. 1 and 4.) P designates a reciprocating plate or carriage which moves in a slot P'' in a plate P', secured to the table A. This plate carries a wire-gripper consisting of a dog R, pivoted to an arm R', projecting from said plate, said dog being held in engagement with the wire by a spring R''. Reciprocating movement is imparted to the plate P through a connecting-rod S, which is pivotally connected to a wrist-pin S', projecting from said plate. The rod S is driven from a shaft U through intervening adjustable crank connections (shown in Figs. 1, 4, and 14) and consisting of a casing T, having a boss T'', with which the shaft U is rigidly connected. The casing T incloses an adjustable piece S'', with which one end of the connecting-rod S is pivotally connected. The position of the connecting-piece S'' within the casing T may be varied by the adjusting-screw T', which passes through said connecting-piece, and thereby the movement of the carriage or feed-plate P may be regulated as desired. The shaft U is driven from the main shaft B through miter-gears F'' and U'. The feed of the wire to a proper position is limited by a gage-plate $p$, with which the end of the wire abuts when fed into position, as shown by the broken lines which represent the wire in Fig. 4. This gage-plate has an adjustable connection with a bolt $p'$, which is mounted on the top plate I'' and is inclosed by a cover. (Broken away in Fig. 1.) The bolt $p'$ is held normally out by a spring $p'''$ and is moved to a proper position to stop the wire at the proper length for a pin by a bolt $q$, which has a cam-surface $i'$, that enters a recess $q'$ in the side of bolt $p'$, and thereby moves said bolt $p'$ against the spring $p'''$. Bolt $q$ is mounted on the top plate I'' in a manner similar to bolt $p'$ and is held out of engagement with bolt $p'$ by a coil-spring $q''$, which surrounds the exposed portion of said bolt $q$. At predetermined times in the movement of cam C', which is the extreme left cam in Fig. 1, the yoke D makes contact with the end of bolt $q$ and drives said bolt into engagement with bolt $p'$. This takes place just as the end of the wire $e''$ abuts with the gage-plate $p$. The wire is shown in Fig. 4 in broken lines in such position. When the wire is fed into this position each time by the feed-plate P, the gage-plate $p$ is moved up to the proper point to stop it by the bolt $q$. After the wire is thus stopped or gaged the bolt $q$ moves out of engagement with bolt $p'$ and the spring $p'''$ moves the gage-plate out again, and thus the wire is permitted to drop between the centering-pieces $i\ i$ and behind the pin $e$, as shown in Fig. 4. Immediately as the wire is fed up to the gage-plate $p$ it is cut off, and each piece is permitted to drop, as above indicated.

The wire-cutting devices are shown in detail in Figs. 7 and 8 and consist of two members—to wit, a holder M' and a cutter M. The former has a horizontal opening $m$, through which the wire is passed, and the cutter M has a knife-edge $m'$, against which the wire is moved and severed in the movement of the holder M'. The cutting member M is under the control of the wire-holding member M' through the medium of an expansion-spring $m''$, which is confined between the end of the said cutting member and a lug $m'''$, that projects from member M'. These wire-cutting devices are arranged side by side in a housing M'', which is adjustably mounted on the top plate I''. The positions of said housing, together with the cutting devices, may be adjusted laterally on the top plate I''. These adjustments are obtainable by means of cross-lugs $n\ n$, projecting from the bottom of the housing M'', which fit in transverse slots $n'\ n'$ in the upper side of the top plate I''. When moved to the desired position, the housing M'' is secured by a bolt I''', which passes through the housing and into the top plate.

The wire-cutting devices are actuated by the following means: As will be seen from Fig. 1, the wire-holding bar M' projects out of the rear end of the housing in a position to be operated by a lever N. This lever is fulcrumed at N' on the top plate I'' and projects in the path of a stud N'''', the said stud being on a reciprocating piece O, which is inclosed in a guide N''. The exposed end of said piece O carries a roller O', which is actuated by cam F' on the main driving-shaft.

It will be seen from Fig. 15 that the finished cotter-pin has its end beveled off. This is done immediately after the pin has been formed, as shown in Fig. 3$^a$.

$r$ is a rotating head, which has a cylindrical body $t$, upon which a pulley $t''$ is mounted. The cylindrical or body portion is inclosed within a bearing $t'$, from the lower portion of which projects a standard $u$, the lower end of which standard has a dovetail or other sliding connection with a guideway $u'$, secured on the base-plate A. The rotating head has an opening $r'$ in its center, into which the end of the cotter-pin enters when said head is moved up to the position shown in Fig. 3$^a$. $s\ s$ are two knives which are projected into said head from opposite sides and just in the rear of the opening $r'$. The inner or cutting ends of these blades are tapered, as at $s'$, whereby the tapering cut is given the end of the cotter-pin. The cuttings fall from said head through the opening $r''$ therein. Rotary movement may be imparted to the head through the pulley $t''$ and other common power-transmission appliances. (Not shown.) The longitudinal reciprocating movement is imparted to move the head back and forth from position shown in Fig. 3$^a$ by the following devices, (see Fig. 1:) $w$ designates an arm projecting from one side of the standard $u$. $w'$ is a reciprocating rod, one end of which is connected to said arm and the other end of which passes through a guide E', which lies below the main driving-shaft. As hereinbefore stated, this guide E' also forms a bearing for one end of shaft D'''. The extreme end $w''$ of said rod $w$ projects upwardly, as shown in broken lines in Fig. 2, and lies in a position to be struck by a cam F on main shaft B.

The machine is timed to operate as follows: Power being transmitted to the main shaft, the feed-plate P, being geared thereto, is under a constant reciprocating movement. As the wire is being fed in each time the gage-plate $p$ is moved in to the proper extent by the actuating-bolt $q$ to gage the feed of wire. The wire is then cut by the operation of the wire-holding bar M through lever N. Simultaneously with the cutting operation the gage-plate $p$ is moved out by the spring $p'''$ and the pin $e$ is lowered into the die $e'$. The cut wire then falls to the position between the centering devices $i\ i$ and behind the pin $e$, as in Fig. 4. When the cut piece of wire has reached this position, the clamping-bar H moves the end $h$ against the wire and partially bends it around the pin $e$. Simultaneously with this movement of bar H the bars $G'\ G'$ are advanced to a proper position for the formers $c'$ to engage the wire on each side of the pin $e$. At this moment the bars G G are advanced, and through the links J J the bars $G'\ G'$ are moved inwardly, and the formers $c'$ complete the formation of the cotter-pin around the pin $e$, as shown in Fig. 3ª. The centering devices $g\ g'$ are moved out by the bars $G'\ G'$. When the pin is thus formed, the head $r$ is moved to a position to receive the end of said pin, and the operation of tapering said end is then completed.

Having described our invention, we claim—

1. In a machine for making cotter-pins, the combination with wire-feeding mechanism, and wire-cutting mechanism, of a pin or former, means for moving said pin or former to a position to form a cotter-pin, a longitudinally-reciprocating clamping and initial-bending bar adapted to clamp the wire against said pin and to initially bend said wire, a longitudinally-reciprocating bending-bar located on each side of said clamping-bar in parallel relation thereto, means for imparting the necessary movements to said bending-bars to engage the wire on each side of the pin after said wire has received its initial bend from the clamping-bar, and means for moving said bending-bars inwardly at their bending ends to complete the formation of the cotter-pin, substantially as specified.

2. In a machine for making cotter-pins, the combination with wire-feeding mechanism, of a vertically-reciprocating pin in the rear of which, wire is fed, a longitudinally-reciprocating clamping-bar adapted to hold said wire against the pin, the said clamping-bar having its engaging end recessed to form the initial bend in the wire, a longitudinally-reciprocating bending-bar located on each side of said clamping-bar in parallel relation thereto, means for imparting longitudinal movement to said bending-bars during which the wire is engaged and is carried around the sides of the pin, and means for moving the bending ends of said bending-bars inwardly after the wire has been carried around the sides of the pin, and whereby the formation of the cotter-pin is completed.

3. In a machine for making cotter-pins, the combination of a pin or former around which the cotter-pins are formed, means for lowering and raising said pin or former at predetermined times, a clamping-bar adapted to clamp the stock against said pin or former and to give the initial bend to said stock, inner reciprocating bars adjacent to said clamping-bar, outer reciprocating bars, and connections between said inner and outer reciprocating bars whereby the inner bars are given inward movements from the longitudinal movements of the outer bars, and means on said inner reciprocating bars for engaging with the stock during said inward movements to impart the final bend thereto which completes the formation of the cotter-pins.

4. In a machine for making cotter-pins, the combination with stock or wire feeding mechanism, of a pin or former, in the rear of which the stock or wire is fed, means for lowering and raising said pin or former at predetermined times, a clamping-bar adapted to press the stock or wire against said pin or former and to initially bend said stock or wire, inner reciprocating bars adjacent to said clamping-bar, outer reciprocating bars, link connections between the outer reciprocating bars and the inner reciprocating bars whereby inward and outward movements are imparted to the inner reciprocating bars from the longitudinal movements of said outer bars, and means on said inner bars for engaging with the wire or stock on each side of the pin or former to impart thereto the final bending in the formation of cotter-pins.

5. In a machine for making cotter-pins, the combination with wire-feeding mechanism, a gage to limit the feed of said wire to the required extent, and cutters for cutting said wire in pieces of the necessary length, of a pin or former in the rear of which the severed pieces of wire find lodgment, means for lowering said pin or former prior to the operation of cutting each piece of wire and for raising said pin or former after each complete operation of forming a cotter-pin, a clamping-bar adapted to clamp each piece of wire against the pin or former and to give the initial bend thereto, a plurality of bars in parallel relation and all of which have longitudinally-reciprocating movements, and two of which have in addition to such movements, movements toward and from each other, the last-named movements being imparted from the bars having the longitudinally-reciprocating movements only, and means for imparting such movements to said bars.

6. In a machine for making cotter-pins, the combination with wire-feeding and wire-cutting mechanisms, of a pin or former, means for moving said pin or former to a position to form a cotter-pin, a longitudinally-reciprocating clamping-bar adapted to clamp the wire around the pin or former and to initially bend said wire, a longitudinally-reciprocating bending-bar on each side of the clamping-bar in parallel relation therewith, outer longitudinally-reciprocating bars, and link connections between said bending-bars and said outer bars whereby the bending-bars are moved inwardly at the completion of their longitudinal movements to complete the formation of the cotter-pin, means for imparting the necessary movements to said bending or clamping bars, and means for pointing the ends of the cotter-pins before they are delivered from the pin or former.

7. In a machine for making cotter-pins, the combination with wire feeding and cutting mechanisms, and devices for gaging each feed of wire, of a pin or former, means for moving said pin or former to a position to form a cotter-pin and to subsequently deliver said cotter-pin, a longitudinally-reciprocating clamping-bar adapted to initially bend the wire around said pin or former, a longitudinally-reciprocating bending-bar located on each side of said clamping-bar in parallel relation therewith, outer reciprocating bars, pivotal connections between the said outer bars and the adjacent bending-bars by means of which the said bending-bars are given inward movements to complete the formation of a cotter-pin, and means for simultaneously imparting movements to the clamping-bar, the bending-bars and said outer bars.

In testimony whereof we affix our signatures in presence of two witnesses.

NATHANIEL W. KIRKPATRICK.
MICHAEL HENRY.

Witnesses:
R. J. McCARTY,
C. M. THEOBALD.